United States Patent
Kreuzer et al.

(10) Patent No.: US 11,280,033 B2
(45) Date of Patent: Mar. 22, 2022

(54) MULTILAYER COVER NONWOVEN FOR A VEHICLE INTERIOR LINING, INTERIOR LINING WITH SUCH A COVER NONWOVEN AND METHOD FOR PRODUCING SUCH A COVER NONWOVEN

(71) Applicant: Sandler AG, Schwarzenbach (DE)

(72) Inventors: Stefan Kreuzer, Schoenwald (DE); Ulrich Hornfeck, Naila (DE)

(73) Assignee: SANDLER AG, Schwarzenbach (DE)

( * ) Notice: Subject to any disclaimer, the term of this patent is extended or adjusted under 35 U.S.C. 154(b) by 189 days.

(21) Appl. No.: 16/581,884

(22) Filed: Sep. 25, 2019

(65) Prior Publication Data
US 2020/0095713 A1    Mar. 26, 2020

(30) Foreign Application Priority Data
Sep. 26, 2018    (DE) .......................... 102018123768.5

(51) Int. Cl.
*D04H 1/498* (2012.01)
*B60R 13/02* (2006.01)
(Continued)

(52) U.S. Cl.
CPC ............. *D04H 1/498* (2013.01); *B32B 5/022* (2013.01); *B32B 5/18* (2013.01); *B32B 5/245* (2013.01);
(Continued)

(58) Field of Classification Search
CPC ...... D04H 1/498; D04H 1/492; D04H 1/4291; D04H 3/007; D04H 3/11; B60R 13/02;
(Continued)

(56) References Cited

U.S. PATENT DOCUMENTS 4,766,029 A * 8/1988 Brock ...................... D04H 3/14
442/382
5,073,436 A * 12/1991 Antonacci ................ D04H 3/16
428/219
(Continued)

FOREIGN PATENT DOCUMENTS

DE        10252295         6/2004
DE    202008015663 U1    3/2009
(Continued)

OTHER PUBLICATIONS

El-Sharkawy et al., "Hydroentanglement bonding process for production of nonwoven fabric," Dept. of Textile Engineering, Alexandria University. (Year: 2014).*
(Continued)

*Primary Examiner* — Jeremy R Pierce
(74) *Attorney, Agent, or Firm* — Fox Rothschild LLP

(57) ABSTRACT

The invention refers to a cover nonwoven for an interior lining for a vehicle, comprising a nonwoven fabric consisting of at least two nonwoven layers, a first nonwoven layer and a second nonwoven layer, wherein a first outer surface of the nonwoven fabric is formed by a surface of the first nonwoven layer and a second outer surface of the nonwoven fabric is formed by a surface of the second nonwoven layer, and wherein the first nonwoven layer and the second nonwoven layer are inseparably bonded on the entire surface. According to the invention, the first nonwoven layer is formed of a rough polypropylene spunlaced nonwoven and the second nonwoven layer is formed of a dense polypropylene spun-bonded nonwoven, wherein the first outer surface of the nonwoven fabric is suitable for the application of a pressure-sensitive adhesive, and wherein the second outer surface of the nonwoven fabric has hydrophobic properties.

7 Claims, 2 Drawing Sheets

(51) Int. Cl.
  *D04H 1/4291* (2012.01)
  *D04H 1/492* (2012.01)
  *D04H 3/007* (2012.01)
  *D04H 3/11* (2012.01)
  *B32B 5/02* (2006.01)
  *B32B 7/12* (2006.01)
  *B32B 7/02* (2019.01)
  *D04H 3/16* (2006.01)
  *D04H 3/14* (2012.01)
  *B32B 5/24* (2006.01)
  *B32B 7/04* (2019.01)
  *B32B 5/18* (2006.01)
  *B32B 5/26* (2006.01)
  *B32B 7/08* (2019.01)
  *B32B 27/12* (2006.01)
  *B32B 27/32* (2006.01)

(52) U.S. Cl.
  CPC ............... *B32B 7/02* (2013.01); *B32B 7/04* (2013.01); *B32B 7/12* (2013.01); *B60R 13/02* (2013.01); *D04H 1/4291* (2013.01); *D04H 1/492* (2013.01); *D04H 3/007* (2013.01); *D04H 3/11* (2013.01); *D04H 3/14* (2013.01); *D04H 3/16* (2013.01); *B32B 5/26* (2013.01); *B32B 7/08* (2013.01); *B32B 27/12* (2013.01); *B32B 27/32* (2013.01); *B32B 2260/021* (2013.01); *B32B 2260/046* (2013.01); *B32B 2262/0253* (2013.01); *B32B 2262/101* (2013.01); *B32B 2266/0278* (2013.01); *B32B 2307/538* (2013.01); *B32B 2307/554* (2013.01); *B32B 2307/584* (2013.01); *B32B 2307/718* (2013.01); *B32B 2307/724* (2013.01); *B32B 2307/7265* (2013.01); *B32B 2307/73* (2013.01); *B32B 2307/732* (2013.01); *B32B 2605/003* (2013.01); *D10B 2321/022* (2013.01); *D10B 2401/021* (2013.01); *D10B 2505/12* (2013.01)

(58) Field of Classification Search
  CPC ............... B32B 5/26; D10B 2505/12; D10B 2401/021; D10B 2321/022
  See application file for complete search history.

(56) References Cited

U.S. PATENT DOCUMENTS

| | | | | |
|---|---|---|---|---|
| 5,208,098 | A | * | 5/1993 | Stover .................... B32B 5/022 |
| | | | | 442/398 |
| 2014/0358101 | A1 | | 12/2014 | Kanya et al. |
| 2016/0222563 | A1 | * | 8/2016 | Sheehan ................ D04H 1/495 |
| 2017/0016158 | A1 | * | 1/2017 | Burgess ................ D04H 1/498 |

FOREIGN PATENT DOCUMENTS

| | | |
|---|---|---|
| DE | 202008015663 | 4/2009 |
| KR | 20150000240 A | 1/2015 |
| WO | 2000/024955 | 5/2000 |
| WO | 2005/037607 | 4/2005 |
| WO | 2006/060403 A2 | 6/2006 |
| WO | 2017/011740 A1 | 1/2017 |

OTHER PUBLICATIONS

Albrecht et al., (Eds.), "Nonwoven Fabrics: Raw Materials, Manufacture, Applications, Characteristics, Testing Processes," WILEY-VCH Verlag GmbH & Co. KGaA, Weinheim (2003), pp. 363-368.

* cited by examiner

MULTILAYER COVER NONWOVEN FOR A VEHICLE INTERIOR LINING, INTERIOR LINING WITH SUCH A COVER NONWOVEN AND METHOD FOR PRODUCING SUCH A COVER NONWOVEN

CROSS REFERENCE TO RELATED APPLICATION

This application claims priority to German Patent Application No. 10 2018 123 768.5, filed Sep. 26, 2018, the disclosure of which is hereby incorporated by reference in its entirety.

BRIEF SUMMARY OF THE INVENTION

The invention refers to a cover nonwoven corresponding to the features of the generic term of the independent claim 1 for an interior lining for a vehicle, with a nonwoven fabric comprising at least two nonwoven layers.

A first outer surface of the nonwoven fabric is formed by a first surface of a first nonwoven layer, and a second outer surface of the nonwoven fabric is formed by a second surface of a second nonwoven layer. The first nonwoven layer and the second nonwoven layer are inseparably bonded over the entire surface.

A cover nonwoven corresponding to the generic term of independent claim 1 is among others known from WO 2005/037607 A2. Cover nonwovens of this type prevent the tool from sticking to a first surface of the interior lining during the manufacture of the interior lining, forming a barrier for the adhesive used to manufacture the interior lining.

In other versions of the state of the art, a resin is used as an adhesive for the production of the interior lining. This is done by impregnating a fibrous fabric with the resin and bonding it to both sides of a layer of rigid foam, whereby the interior lining comprises two layers of a fibrous fabric impregnated with resin. The resin in the first layer of the fibrous fabric bonds the cover nonwoven to the interior lining, and the resin in the second layer of the fibrous fabric bonds the decor forming a second surface of the interior lining to the interior lining. The hydrophobic properties of the cover nonwoven create a barrier effect against the resin. These hydrophobic properties include cover nonwovens formed from a polyolefin nonwoven, for example a polypropylene nonwoven. Since the first surface of the interior lining, which is formed by the cover nonwoven, is usually used for fastening other components, in particular cables, the components adhering to the cover nonwoven by means of adhesive tape, the hydrophobic properties of the cover nonwoven have a detrimental effect on the adhesive effect of the pressure-sensitive adhesive of the adhesive tape.

The object of the present invention is to provide a cover nonwoven for an interior lining which has both a good barrier effect against the resin used for the manufacture of the interior lining and a suitable adhesive base for the application of a pressure-sensitive adhesive.

The object is solved by the features of the independent claim 1, according to which a cover nonwoven according to the generic term of the independent claim 1 is an inventive solution of the object if the first nonwoven layer is formed from a rough polypropylene (PP) spunlaced nonwoven and the second nonwoven layer is formed from a dense PP spun-bonded nonwoven, wherein the first outer surface of the nonwoven fabric is suitable for the application of a pressure-sensitive adhesive and wherein the second outer surface of the nonwoven fabric has distinct hydrophobic properties.

Due to the hydrophobic properties of the PP spun-bonded nonwoven, the second outer surface of the nonwoven fabric prevents the adhesive of the interior lining from penetrating and thus the interior lining from sticking to the tool. At the same time, the rough surface of the PP spunlaced nonwoven allows components, in particular cables, to be fastened by means of adhesive tapes adhering to the first outer surface. By combining both properties in one nonwoven fabric, the number of components of the interior lining and thus the manufacturing effort for the interior lining can be kept low. In addition, both PP nonwovens have sufficient stretchability to allow sufficient elongation of the nonwoven fabric for the deformation that occurs when it is attached to the interior lining.

Advantageous embodiments of the present invention are the subject of the subclaims.

In accordance with a particularly preferred embodiment of the present invention, the first nonwoven layer exhibits abrasion resistance up to the destruction of the fibrous structure of the first nonwoven layer according to the Martindale method of a maximum of 2,000 intervals with a weight load of 12 kN. Thus the structure of the first nonwoven layer is already destroyed at a wear index of at most 2,000 Martindale. Preferably, the first nonwoven layer is characterized by the fact that the structure shows slight signs of wear at a wear index of 100 Martindale, shows clear signs of wear at 500 Martindale and is destroyed at a wear index of 1,000 Martindale. This is achieved by the fact that a ratio (p/v) of the entangling pressure (p) used to solidify the first nonwoven layer and the production speed (v) does not exceed a value of 9.0 bar/(m/min) and preferably lies in the range between 6.0 and 8.0 bar/(m/min).

According to another particularly preferred embodiment of the present invention, the second nonwoven layer has an abrasion resistance up to the destruction of the fibrous structure of the second nonwoven layer according to the Martindale method of at least 20,000 intervals at a weight load of 12 kN. Thus the structure of the second nonwoven layer is destroyed at the earliest at a wear index of at least 20,000 Martindale. The preferred feature of the second nonwoven layer is that slight signs of wear are only visible at a wear index of 1,000 Martindale and clear signs of wear are only visible at 10,000 Martindale. This is ensured by the fact that the parameters calender pressure (q), calender temperature (T) and production speed (v) are selected so that a ratio (q·T/v) does not fall below a value of 60 K·MPa·s, and preferably lies in a range between 70 and 100 K·MPa·s.

According to a particularly preferred embodiment of the present invention, the nonwoven fabric has a weight per unit area between 60 g/m$^2$ and 90 g/m$^2$, which keeps the weight of the interior lining low.

According to another particularly preferred embodiment of the present invention, the second nonwoven layer has a weight per unit area between 25 g/m$^2$ and 40 g/m$^2$.

According to another embodiment of the present invention, the second nonwoven layer comprises at least one melt-blown intermediate layer, whereby the melt-blown intermediate layer improves the barrier effect of the PP nonwoven.

According to an alternative embodiment of the present invention, the second nonwoven layer has a thickness of 0.1 mm to 0.8 mm, thus avoiding excessive porosity, which has a negative effect on the barrier effect of the cover nonwoven.

According to another preferred embodiment of the present invention, the second nonwoven layer has a water resistance of at least 20 cmH$_2$O. This ensures a suitable barrier effect against the adhesive used to manufacture the interior lining.

Furthermore, preferably the second nonwoven layer has an air permeability of at most 400 l/(m$^2$·s) at a pressure difference of 1 mbar between the first outer surface of the second nonwoven layer and the second outer surface of the second nonwoven layer. This ensures a suitable barrier effect against the adhesive used to manufacture the interior lining.

According to another embodiment of the present invention, the first nonwoven layer is thermally laminated onto the second nonwoven layer with the aid of a calender. This prevents perforation of the nonwoven fabric and achieves a particularly good barrier effect. It is important, however, to maintain a fibrous first outer surface with low abrasion resistance, which can result in particularly good adhesion for a pressure-sensitive adhesive.

According to an alternative embodiment of the present invention, the first nonwoven layer and the second nonwoven layer are connected by hydroentanglement. This results in particularly good adhesion between the nonwoven layers. Particularly advantageous is the bonding of the first nonwoven layer and the second nonwoven layer by a combination of a hydroentanglement with a lower entangling intensity and a thermal calendering with a low contact pressure between the calender rolls, whereby both a disadvantageous perforation of the nonwoven fabric and a disadvantageous smoothing of the first outer surface of the nonwoven fabric are reduced, and a particularly good adhesion of the nonwoven layers to each other can be achieved.

The present invention also provides an interior lining for a vehicle with a cover nonwoven according to the invention. A first outer surface of the cover nonwoven forms an outer surface of the interior lining, the cover nonwoven being in direct contact with a fibrous composite of the interior lining with a second outer surface, the fibrous composite comprising a resin matrix which bonds the cover nonwoven to the fibrous composite.

Furthermore, the invention also provides a method for producing the cover nonwoven according to the invention. The method is defined by the features of the independent claim 13. Advantageous embodiments of the method according to the invention concern the previously mentioned ratio (p/v) at the solidification of the first nonwoven layer as well as the also previously mentioned ratio (q·T/v) at the solidification of the second nonwoven layer.

BRIEF DESCRIPTION OF THE DRAWINGS

An embodiment of the present invention is explained in more detail below using drawings.

DETAILED DESCRIPTION OF THE INVENTION

Figure 1:
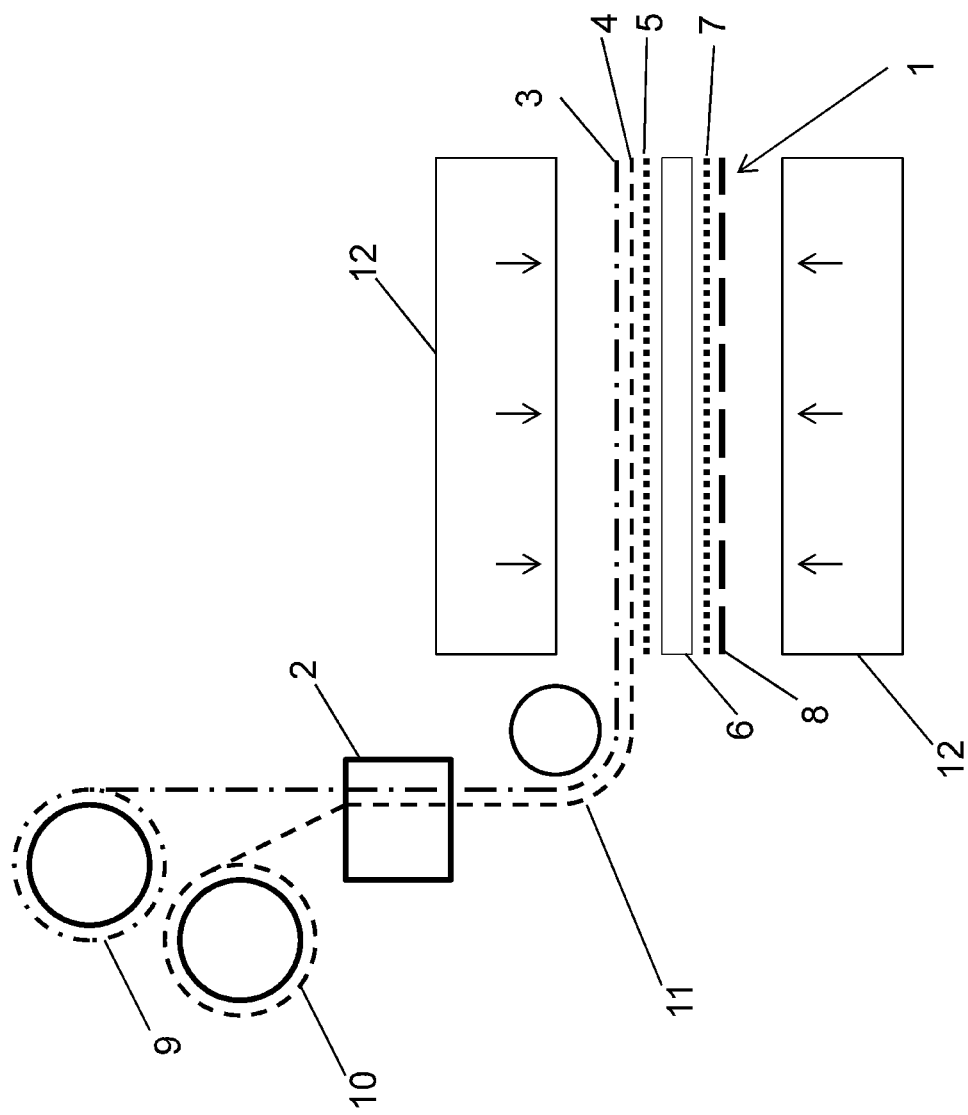
FIG. 1 shows a section through an embodiment of a cover nonwoven according to the invention with a nonwoven fabric 11 and an interior lining 1 with a cover nonwoven according to the invention, as well as a concept for the production of the nonwoven fabric 11 and the interior lining 1.

As shown in FIG. 1, the nonwoven fabric 11 is formed from a first nonwoven layer 3 and a second nonwoven layer 4, wherein the first nonwoven layer 3 is a rough PP spunlaced nonwoven and the second nonwoven layer 4 is a dense PP spun-bonded nonwoven.

The PP spunlaced nonwoven 3 from a first source 9 and the PP spun-bonded nonwoven 4 from a second source 10 are joined together in a device for joining the two nonwoven layers 2. To produce an interior lining 1 with a cover nonwoven according to the invention, the cover nonwoven with the nonwoven fabric 11 is placed on the remaining layers of the interior lining 1. One surface of the PP spunlaced nonwoven 3 forms a first outer surface of the nonwoven fabric 11, and one surface of the PP spun-bonded nonwoven 4 forms a second outer surface of the nonwoven fabric 11, wherein the second outer surface of the nonwoven fabric 11 is in direct contact with a fibrous composite 5 of the interior lining, wherein the fibrous composite comprises a resin matrix which bonds the cover nonwoven 11 to the fibrous composite 5. In this embodiment, the fibrous composite 5 is made with a glass fiber fabric. The hydrophobic properties of the PP spun-bonded nonwoven 4 prevent the resin from penetrating the second outer surface of the nonwoven fabric, thereby preventing the interior lining 1 from sticking to a tool 12 during the pressing process in the manufacture of the interior lining 1. To ensure a suitable barrier effect of the PP spun-bonded nonwoven 4, the PP spun-bonded nonwoven 4 has a water resistance of 20 cmH$_2$O and an air permeability of 400 l/(m·s$^2$) at a pressure difference of 1 mbar.

The PP spunlaced nonwoven 3 thus forms a first surface of the interior lining 1, on which components can be fastened with a pressure-sensitive adhesive, in particular cables with an adhesive tape.

The interior lining 1 further comprises a layer of rigid polyurethane foam 6, approximately 10 mm thick, sandwiched between a first fibrous composite 5 and a second fibrous composite 7, both comprising a glass fiber fabric and a resin matrix. The first fibrous composite 5 is in direct contact with the nonwoven fabric 11, the nonwoven fabric 11 being bonded thereto by means of the resin matrix of the first fibrous composite 5, and the second fibrous composite 7 being in direct contact with a decor 8, the decor 8 being bonded thereto by means of the resin matrix of the second fibrous composite 7, the decor 8 forming a second surface of the interior lining 1 which is visible towards the interior of the vehicle.

Figure 2:
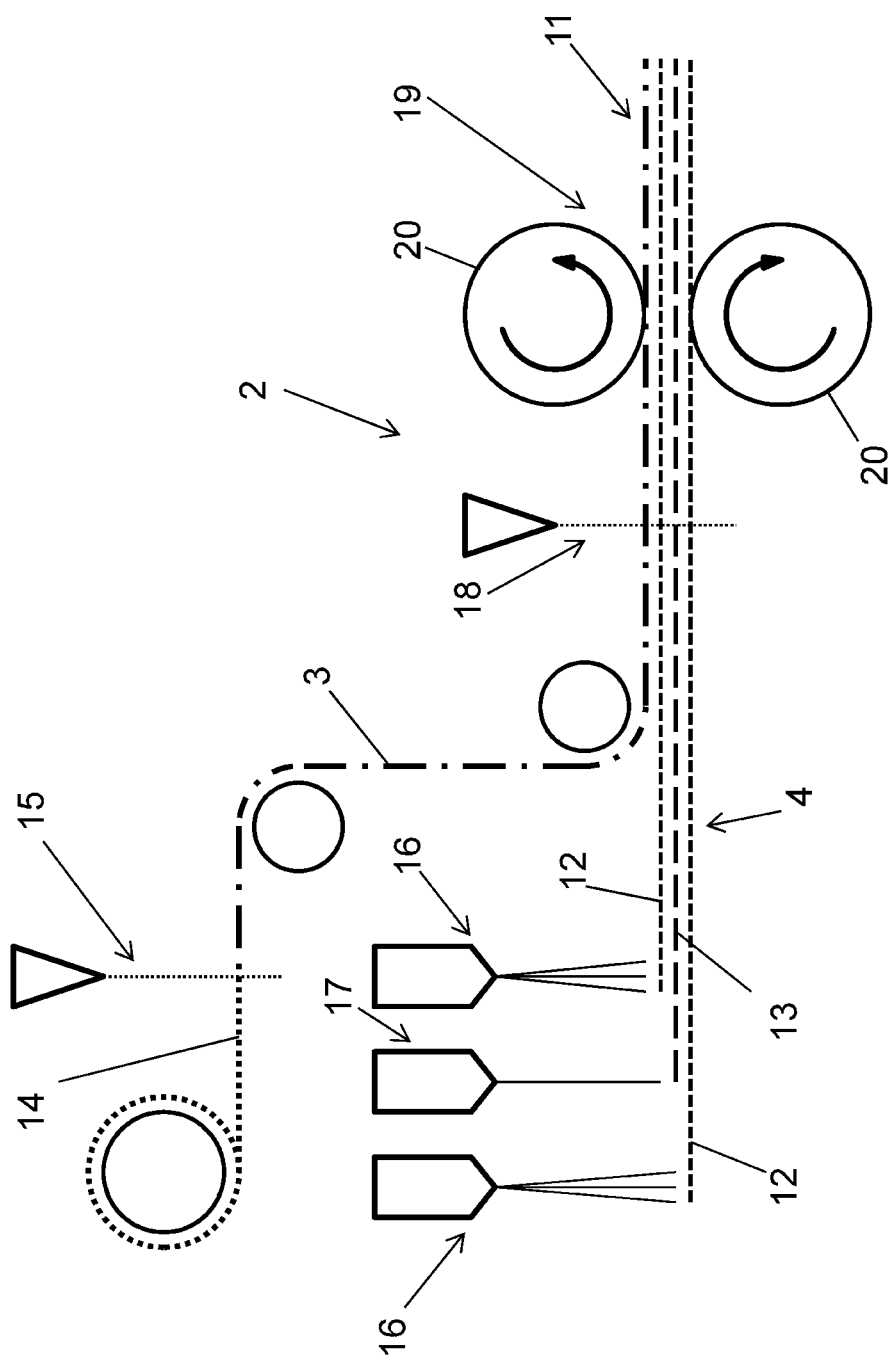
FIG. 2 shows a concept for the production of a cover nonwoven according to the invention with a nonwoven fabric 11.

As shown in FIG. 2, the PP nonwoven 3 is formed by a spunlaced PP pile, which is formed by an un-bonded nonwoven 14 by hydroentanglement 15, as the fibrous surface enables a particularly good adhesive effect by a pressure-sensitive adhesive.

The PP spun-bonded nonwoven 4 comprises two spun-bonded layers 12 and a melt-blown intermediate layer 13, which lies between the two spun-bonded layers 12, resulting in an SMS structure of the PP spun-bonded nonwoven 4. Alternatively, two melt-blown intermediate layers 13 can also be used, resulting in an SMMS structure of the PP spun-bonded nonwoven 4. A spun-bonded layer 12 formed by a spun-bonded beam 16 is covered by a melt-blown intermediate layer 13 formed by a melt-blown beam 17 and then covered by another spun-bonded layer 12.

The weight per unit area of the PP spun-bonded nonwoven 4 is between 25 g/m$^2$ and 40 g/m$^2$ and the thickness of the PP spun-bonded nonwoven 4 is between 0.1 mm and 0.8 mm, whereby the weight per unit area of the entire nonwoven fabric is between 60 g/m$^2$ and 90 g/m$^2$.

A hydroentanglement device 18 and a subsequent thermal calendering device 19 are used to bond the PP spunlaced nonwoven 3 to the PP spun-bonded nonwoven and to solidify the resulting nonwoven fabric 11. In the hydroentanglement device 18, the PP spunlaced nonwoven 3 is deposited on the PP spun-bonded nonwoven 4 and needled onto the PP spun-bonded nonwoven 4 by hydroentangelement. This results in good adhesion between the two nonwoven layers. With the device for thermal calendering 19, the PP spunlaced nonwoven 3 is thermally laminated onto the PP spun-bonded nonwoven 4 with the aid of two calender rollers 20. Through the combination of hydroentanglement 18 and subsequent calendering 19, both the entangling intensity of the hydroentanglement 18 and the contact pressure between the calender rollers 20 during thermal calendering 19 can be reduced, whereby on the one hand the perforation of the nonwoven fabric 11 can be reduced, and on the other hand a disadvantageous smoothing of the first outer surface of the nonwoven fabric 11 can be reduced, whereby the connection of the PP spunlaced nonwoven 3 with the PP spun-bonded nonwoven 4 can be improved.

The invention claimed is:

1. A method of manufacturing a cover nonwoven for an interior lining for a vehicle the method comprising:
    forming a nonwoven fabric having at least two nonwoven layers, the at least two nonwoven layers comprising a first nonwoven layer and a second nonwoven layer,
wherein a first outer surface of said nonwoven fabric is formed by a surface of said first nonwoven layer and a second outer surface of said nonwoven fabric is formed by a surface of said second nonwoven layer;
    wherein the first outer surface of the nonwoven fabric is suitable for applying a pressure-sensitive adhesive, and
    wherein the second outer surface of the nonwoven fabric has hydrophobic properties; and
    inseparably bonding the first nonwoven layer and the second nonwoven layer over the entire surface,
    wherein the first nonwoven layer is formed from a rough polypropylene spunlaced nonwoven,
    wherein the first nonwoven layer is rough due to a ratio (p/v) of an entangling pressure (p) applied to solidify the first nonwoven layer and a production speed (v) where the ratio does not exceed a value of 9.0 bar/(m/min),
    wherein the second nonwoven layer is formed from a dense polypropylene spun-bonded nonwoven,
    wherein the second nonwoven layer is dense by virtue of having an air permeability of at most 400 l/(m²·s) at a pressure difference of 1 mbar between the first outer surface of the second nonwoven layer and the second outer surface of the second nonwoven layer.

2. The method according to claim 1, wherein the ratio (p/v) is in the range between 6.0 and 8.0 bar/(m/min).

3. The method according to claim 1, wherein the second nonwoven layer is solidified by means of a calender, wherein the parameters of calender pressure (q), calender temperature (T) and production speed (v) are selected during the solidification of the second nonwoven layer such that a ratio (q·T/v) does not fall below a value of 60 K·MPa·s.

4. The method according to claim 3, wherein the ratio (q·T/v) is in the range between 70 and 100 K·MPa·s.

5. The method according to claim 3, wherein the first nonwoven layer is thermally laminated onto the second nonwoven layer with the aid of a calender, or wherein the first nonwoven layer and the second nonwoven layer are joined by means of hydroentanglement.

6. The method according to claim 3, wherein the first nonwoven layer or the second nonwoven layer has an abrasion resistance up to the destruction of the fibrous structure of the first nonwoven layer according to the Martindale method of at most 2,000 intervals at a weight load of 12 kN.

7. The method according to claim 3, wherein:
    the second nonwoven layer has a weight per unit area between 25 g/m² and 40 g/m²; or
    the second nonwoven layer comprises at least one melt-blown intermediate layer; or
    the second nonwoven layer has a thickness of 0.1 mm to 0.8 mm; or
    the second nonwoven layer has a water resistance of at least 20 cmH₂O.

* * * * *